United States Patent
Takahashi et al.

(10) Patent No.: US 10,591,506 B2
(45) Date of Patent: Mar. 17, 2020

(54) ROTATION SPEED DETECTION DEVICE

(71) Applicants: YANMAR CO., LTD., Osaka-shi, Osaka (JP); TOYOTA JIDOSHA KABUSHIKI KAISHA, Toyota-shi, Aichi (JP)

(72) Inventors: Takeshi Takahashi, Osaka (JP); Hidenori Nomura, Osaka (JP); Mitsuhiro Hibino, Osaka (JP); Kazuhiro Yamada, Osaka (JP); Toshiro Itatsu, Toyota (JP)

(73) Assignees: YANMAR CO., LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 14/418,554

(22) PCT Filed: Jul. 29, 2013

(86) PCT No.: PCT/JP2013/070511
§ 371 (c)(1),
(2) Date: Jan. 30, 2015

(87) PCT Pub. No.: WO2014/021276
PCT Pub. Date: Feb. 6, 2014

(65) Prior Publication Data
US 2015/0198624 A1    Jul. 16, 2015

(30) Foreign Application Priority Data
Aug. 8, 2012  (JP) ................................ 2012-172397

(51) Int. Cl.
*G01P 3/49* (2006.01)
*F01D 17/06* (2006.01)
(Continued)

(52) U.S. Cl.
CPC ................ *G01P 3/49* (2013.01); *F01D 17/06* (2013.01); *F01D 21/02* (2013.01); *F04D 27/001* (2013.01);
(Continued)

(58) Field of Classification Search
CPC ........ F01D 17/06; F01D 21/02; F01D 21/045; F01D 2037/122; F02B 2037/122;
(Continued)

(56) References Cited

U.S. PATENT DOCUMENTS

| 5,829,254 A | 11/1998 | Hayashi et al. |
| 2005/0017709 A1* | 1/2005 | Stolfus .................... F01D 17/06 324/174 |

(Continued)

FOREIGN PATENT DOCUMENTS

| JP | 09-177555 A | 7/1997 |
| JP | 2005-201146 A | 7/2005 |

(Continued)

OTHER PUBLICATIONS

Notice of Reason for Refusal dated Oct. 28, 2014, in Japanese Patent Application No. JP2012-172397, with partial English translation.

*Primary Examiner* — Peter J Macchiarolo
*Assistant Examiner* — Herbert K Robert
(74) *Attorney, Agent, or Firm* — Norton Rose Fulbright US LLP

(57) ABSTRACT

The purpose of the present invention is to provide a rotation speed detection device which achieves improved detection accuracy regardless of a compressor and the operating state of the compressor, and enables the prevention of the breakage of a detection unit. A rotation speed detection device for a compressor, wherein a detection unit for detecting full blades and splitter blades that are blades approaching a (Continued)

compressor casing of the compressor in response to a change in the inductance of a magnetic field is provided. The detection unit is provided in an overlap region in which the full blades and the splitter blades that are all blades can be detected and the exposure pressure is in the range of a gauge pressure of one atmosphere or less.

10 Claims, 5 Drawing Sheets

(51) Int. Cl.
    *F01D 21/02*     (2006.01)
    *G01P 3/481*     (2006.01)
    *F04D 27/00*     (2006.01)
    *F02B 39/16*     (2006.01)
    *F01D 21/04*     (2006.01)
    *F02B 37/12*     (2006.01)

(52) U.S. Cl.
    CPC ............ G01P 3/481 (2013.01); *F01D 21/045* (2013.01); *F02B 2037/122* (2013.01); *F02B 2039/168* (2013.01); *F05D 2220/40* (2013.01)

(58) Field of Classification Search
    CPC .... G01P 3/24; G01P 3/481; G01P 3/49; G01P 3/81; F04D 27/00; F04D 27/001; F04D 29/28; F04D 29/284
    USPC ...................................................... 73/514.39
    See application file for complete search history.

(56) References Cited

U.S. PATENT DOCUMENTS

| | | | | |
|---|---|---|---|---|
| 2005/0155349 A1* | 7/2005 | Sugiura | ................. | F02B 37/14 60/605.1 |
| 2006/0006860 A1* | 1/2006 | Ban | ........................ | G01P 3/488 324/164 |
| 2007/0075703 A1* | 4/2007 | Biber | .................... | F01D 21/003 324/179 |
| 2007/0186551 A1* | 8/2007 | Ante | ........................ | F01D 17/06 60/605.1 |
| 2007/0200562 A1 | 8/2007 | Shimomura et al. | | |
| 2007/0268014 A1 | 11/2007 | Shimomura et al. | | |
| 2008/0115570 A1* | 5/2008 | Ante | ........................ | F01D 5/025 73/114.77 |
| 2008/0118377 A1* | 5/2008 | Ante | ........................ | F01D 17/06 417/407 |
| 2010/0175375 A1* | 7/2010 | Gilch | ..................... | F01D 17/10 60/602 |
| 2010/0332180 A1* | 12/2010 | Seidel | ................. | F02D 41/0007 702/145 |
| 2012/0107131 A1* | 5/2012 | Ho | ........................ | F04D 29/284 416/241 R |
| 2015/0308859 A1* | 10/2015 | Lerchenmueller | ...... | F02D 41/22 73/114.69 |
| 2018/0156113 A1* | 6/2018 | Cigal | ..................... | F01D 17/06 |
| 2018/0230846 A1* | 8/2018 | Kawano | .................. | F01D 17/06 |
| 2018/0330874 A1* | 11/2018 | Tuor | ........................ | F02C 6/12 |
| 2018/0340954 A1* | 11/2018 | Ishino | ..................... | F02B 39/16 |

FOREIGN PATENT DOCUMENTS

| | | |
|---|---|---|
| JP | 2007-198821 A | 8/2007 |
| JP | 2007-232470 A | 9/2007 |
| JP | 2008-014656 A | 1/2008 |
| JP | 2011-241733 A | 12/2011 |

* cited by examiner (a)

(b)

(a)

(b)

ROTATION SPEED DETECTION DEVICE

CROSS-REFERENCE TO RELATED APPLICATIONS

This is a national phase application based on the PCT International Patent Application No. PCT/JP2013/070511 filed Jul. 29, 2013, claiming priority to Japanese Patent Application No. 2012-172397 filed Aug. 2, 2012, the entire contents of both of which are incorporated herein by reference.

TECHNICAL FIELD

The present invention relates to a rotation speed detection device. Particularly, the present invention relates to the rotation speed detection device for a compressor.

BACKGROUND ART

Conventionally, a rotation speed detection device for detecting the rotation speed of a compressor by utilizing the variation of a magnetic field is publicly known. In this rotation speed detection device, a detection unit (a sensor) for detecting the variation of a magnetic field is provided with a casing of the compressor. The rotation speed detection device measures the rotation speed of the compressor by detecting the variation of a magnetic field due to approach of blades that are detected bodies. An example for this is shown in Patent Literature 1.

With respect to the rotation speed detection device of Patent Literature 1, the detection unit is arranged such that the detection unit is exposed to an intake compression passage inside of the compressor so as to detect the approach of the blades accurately. The inside of the intake compression passage is in a high-temperature and high-pressure state due to compression heat that is generated in a process in which intake air is pressurized and compressed by the blades. As such, in the conventional rotation speed detection device, dissolved loss due to intake pressure or compression heat and decrease of detection accuracy can be induced depending on the operation state of the compressor and the position of the detection unit arranged inside of the intake compression passage.

PRIOR ART DOCUMENTS

Patent Literature

Patent Literature 1: JP Unexamined Patent 2008-14656

SUMMARY OF THE INVENTION

Problems to be Solved by the Invention

The present invention has been made in view of above-mentioned problems. An object of the invention is to provide a rotation speed detection device which can achieve improved detection accuracy regardless of a compressor and the operating state of the compressor, and enables the prevention of the breakage of a detection unit.

Means for Solving the Problems

The above is the problems to be solved by the present invention. Hereinafter, means for solving the problems will be explained.

The present invention relates to a rotation speed detection device for a compressor. In this rotation speed detection device, a detection unit for detecting blades that are approaching a casing of the compressor in response to a change in the inductance of a magnetic field is provided. The detection unit is provided in an overlap region in which all of the blades can be detected and the exposure pressure is in the range of a gauge pressure of one atmosphere or less.

With respect to the present invention, the detection unit is provided in an overlap region in which all of the blades can be detected and the exposure pressure is in the range of the gauge pressure of one atmosphere or less. The detection unit is provided such that end portions of the blades at which the blade width of the outer periphery of the compressor hub that supports the blades in a perpendicular direction is maximized are detected.

EFFECTS OF THE INVENTION

The present invention elicits effects as mentioned below.

According to the present invention, upon detecting the blades, the detection result is not affected by the pressure of the pressurized and compressed intake air and compression heat. As such, improved detection accuracy is achieved regardless of the compressor and the operating state of the compressor, and the breakage of the detection unit can be prevented.

According to the present invention, upon detecting the blades, the detection result is not affected by the pressure of the pressurized and compressed intake air and compression heat. As such, the arrangement of the detection unit can easily be determined regardless of the shape of the blades. Accordingly, improved detection accuracy is achieved regardless of the compressor and the operating state of the compressor, and the breakage of the detection unit can be prevented.

DESCRIPTION OF EMBODIMENTS

Hereinafter, an explanation will be given of a turbocharger 1 according to an embodiment of the present invention with reference to FIG. 1.

Figure 1:
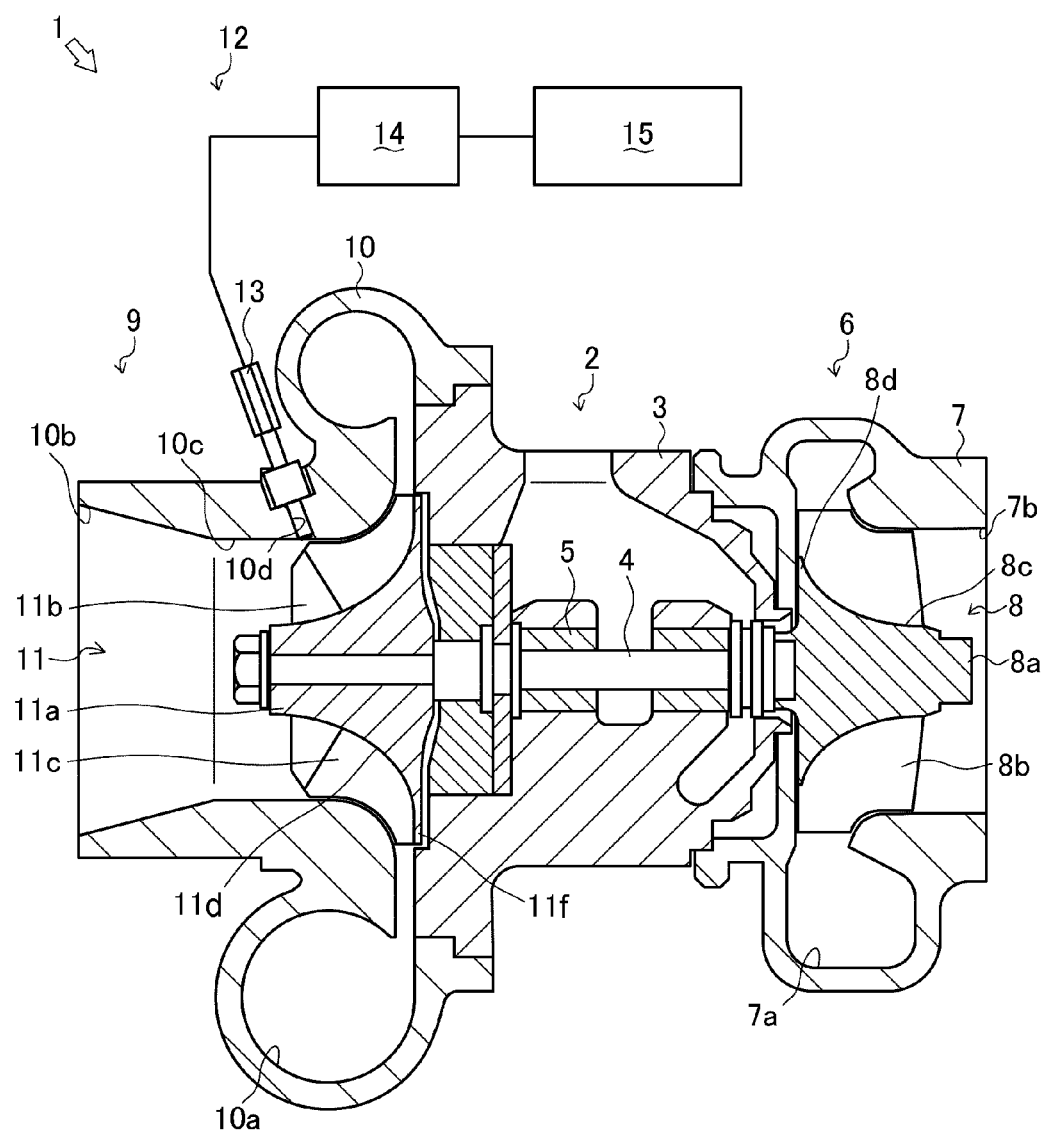
FIG. 1 is a cross-sectional view showing the configuration of a turbocharger and a rotation speed detection device according to an embodiment of the present invention.

As shown in FIG. 1, the turbocharger 1 supplies, by using the discharge pressure of the exhaust gas exhausted from an engine (not shown) as a driving source, the pressurized and compressed intake air to the engine (not shown). The turbocharger 1 includes a connecting member 2, a turbine 6, a compressor 9, etc.

The connecting member 2 connects the turbine 6 and the compressor 9. The connecting member 2 includes a center housing 3, a coupling shaft 4, bearings 5, etc. The turbine 6 is coupled to one end side of the center housing 3, whereas the compressor 9 is coupled to the other end side of the center housing 3. The coupling shaft 4 connects an after-mentioned turbine wheel 8 and an after-mentioned compressor wheel 11. The coupling shaft 4 is rotatably supported by the center housing 3 through the bearings 5.

The turbine 6 converts the exhaust gas pressure of the engine (not shown) into rotational driving force. The turbine 6 includes a turbine casing 7, the turbine wheel 8, etc.

The turbine casing 7 is formed in a bottomed cylindrical shape. The center housing 3 is coupled to one end side (bottomed side) of the turbine casing 7. An exhaust gas supply passage 7a in which exhaust gas is supplied to an outer periphery part thereof is formed on the one end side of the turbine casing 7. An exhaust port 7b of the exhaust gas is formed on the other end side (opposite to the bottomed side) of the turbine casing 7. The coupling shaft 4 pierces the bottom part of the turbine casing 7. The exhaust gas supply passage 7a of the turbine casing 7 is formed to communicate with the interior portion of the turbine casing 7.

The turbine wheel 8 is configured from a turbine hub 8a serving as a base of the turbine wheel 8, and a plurality of turbine blades 8b arranged at regular intervals in a circumferential direction of an outer periphery surface 8c of the turbine hub 8a. The turbine hub 8a is fixed to the coupling shaft 4, thereby the turbine wheel 8 is rotatably supported by the center housing 3. At the end side opposite to the coupling shaft 4 of the turbine hub 8a, the outer periphery surface 8c extends parallel to the shaft center of the coupling shaft 4. The outer periphery surface 8c is made up of a curved surface whose diameter increases toward the coupling shaft 4 side. At the coupling shaft 4 side end portion of the turbine hub 8a, a flange 8d extending perpendicular to the shaft center of the coupling shaft 4 is formed.

The turbine wheel 8 is disposed inside the turbine casing 7 in a state in which the outer periphery of the flange 8d of the turbine hub 8a (diametrically expansive side) is placed opposite to the exhaust gas supply passage 7a of the turbine casing 7, whereas the diametrically decreasing side end portion of the turbine hub 8a is placed opposite to the exhaust port 7b of the turbine casing 7. That is to say, the turbine wheel 8 is disposed such that the outer diameter of the turbine hub 8a is decreased from the supply side to the exhaust side of the exhaust gas. Because of this configuration, the turbine wheel 8 is rotated by the exhaust pressure of the exhaust gas supplied to the exhaust gas supply passage 7a. While the turbine wheel 8 is rotating, the exhaust gas is guided to a direction parallel to the rotational direction by the outer periphery surface 8c of the turbine hub 8a. Then, the exhaust gas is exhausted from the exhaust port 7b.

The compressor 9 pressurizes and compresses the intake air of the engine. The compressor 9 includes a compressor casing 10, the compressor wheel 11, etc.

The compressor casing 10 is formed in a cylindrical shape. The center housing 3 is coupled to one end side of the compressor casing 10, thereby a bottom part of the compressor casing 10 is formed. The coupling shaft 4 pierces the bottom part of the compressor casing 10 formed by the center housing 3. An intake air exhaust passage 10a in which the intake air is exhausted to the outer periphery part thereof is formed on the one end side (the bottomed side) of the compressor casing 10. A supply port 10b is formed on the other end side (opposite to the bottomed side) of the compressor casing 10. An inside wall 10c of the compressor casing 10 is formed such that the inner diameter thereof is increased toward the one end side of the compressor casing 10. Thereby the inside of the compressor casing 10 is formed to communicate with the intake air exhaust passage 10a.

The compressor wheel 11 is configured from a compressor hub 11a serving as a base of the compressor wheel 11, and a plurality of full blades 11b (whole blades) and a plurality of splitter blades 11c (short blades) arranged alternately at regular intervals in a circumferential direction of an outer periphery surface 11d of the compressor hub 11a.

The compressor hub 11a of the compressor wheel 11 is fixed to the coupling shaft 4, thereby the compressor wheel 11 is rotatably supported by the center housing 3. That is to say, the compressor wheel 11 is configured such that the rotative power from the turbine wheel 8 is transmitted to the compressor wheel 11 through the coupling shaft 4. At the end side opposite to the coupling shaft 4 of the compressor hub 11a, the outer periphery surface 11d extends parallel to the shaft center of the coupling shaft 4. The outer periphery surface 11d is made up of a curved surface whose diameter increases toward the coupling shaft 4 side. At the coupling shaft 4 side end portion of the compressor hub 11a, a flange 11e extending perpendicular to the shaft center of the coupling shaft 4 is formed. The full blades 11b (whole blades) and the splitter blades 11c (short blades) are formed along the inside wall 10c of the compressor casing 10 such that minute gaps are formed between outer edge shapes of the blades 11b, 11c and the inside wall 10c. Moreover, the diametrically decreasing side end decreasing portions of the splitter blades 11c are arranged more on diametrically expansive side than the diametrically decreasing side end portions of the full blades 11b. Here, the splitter blades 11c are not indispensable components of the compressor wheel 11.

The compressor wheel 11 is disposed inside the compressor casing 10 in a state in which the outer periphery of the flange 11e of the compressor hub 11a (diametrically decreasing side) is placed opposite to the intake air exhaust passage 10a of the compressor casing 10, whereas the diametrically decreased side end portion of the compressor hub 11a is placed opposite to the supply port 10b of the compressor casing 10. That is to say, the compressor wheel 11 is disposed such that the outer diameter of the compressor hub 11a is increased from the supply side to the exhaust side of the intake air. Here, the gap between the inside wall 10c of the compressor casing 10 and the compressor hub 11a become narrower as approaching to the intake air exhaust passage 10a. That is to say, inside the compressor casing 10, an intake air compress passage 11f (see FIG. 2, FIG. 3) is formed by a space surrounded by the inside wall 10c of the compressor casing 10, the full blades 11b, the splitter blades 11c, and the outer periphery surface 11d.

As mentioned above, with respect to the turbocharger 1, when the exhaust gas is supplied to the turbine 6, the turbine wheel 8 is rotated by exhaust pressure. The compressor wheel 11 coupled to the turbine wheel 8 is rotated by the rotary drive power of the turbine wheel 8. The compressor wheel 11 takes intake air from the supply port 10b of the intake air. The intake air is eliminated to the intake air exhaust passage 10a through the intake air compress passage 11f by the compressor wheel 11. On this occasion, the intake air is pressurized and compressed at the intake air compress passage 11f. As such, compression heat is generated.

Next, an explanation will be given of a rotation speed detection device 12 according to an embodiment of the present invention with reference to FIG. 1.

As shown in FIG. 1, the rotation speed detection device 12 detects the rotation speed of the compressor 9. The rotation speed detection device 12 includes a detection unit 13, an amplifier 14, a controller 15, etc. The rotation speed detection device 12 detects the rotation speed of the compressor 9 by detecting the full blades 11b and the splitter blades 11c by the detection unit 13.

The detection unit 13 detects the full blades 11b and the splitter blades 11c. The detection unit 13 is attached to the compressor casing 10 by inserting into an insertion hole 10d formed on the intake air supply port 10b side of the compressor casing 10. On this occasion, the detection unit 13 is disposed such that the distal end of the detection unit 13 does not project from the inside wall 10c of the compressor casing 10. The detection unit 13 has a coil (not shown) for generating a magnetic field inside the approximately cylindrical shaped housing. The detection unit 13 detects the passing of the full blades 11b and the splitter blades 11c by detecting a change in the inductance. The change in the inductance occurs in response to the passing of the full blades 11b and the splitter blades 11c through the magnetic field generated by the coil.

The amplifier 14 amplifies signals from the detection unit 13. The amplifier 14 is connected to the detection unit 13, thereby signals from the detection unit 13 are obtained. The amplifier 14 amplifies signals from the detection unit 13 and sends them to the controller 15. The controller 15 calculates the rotating speed of the compressor 9. The controller 15 is connected to the amplifier 14, thereby the controller 15 obtains the amplified signals from the amplifier 14. The controller 15 calculates the rotation speed of the compressor 9 by using the amplified signals from the amplifier 14.

Figure 2:
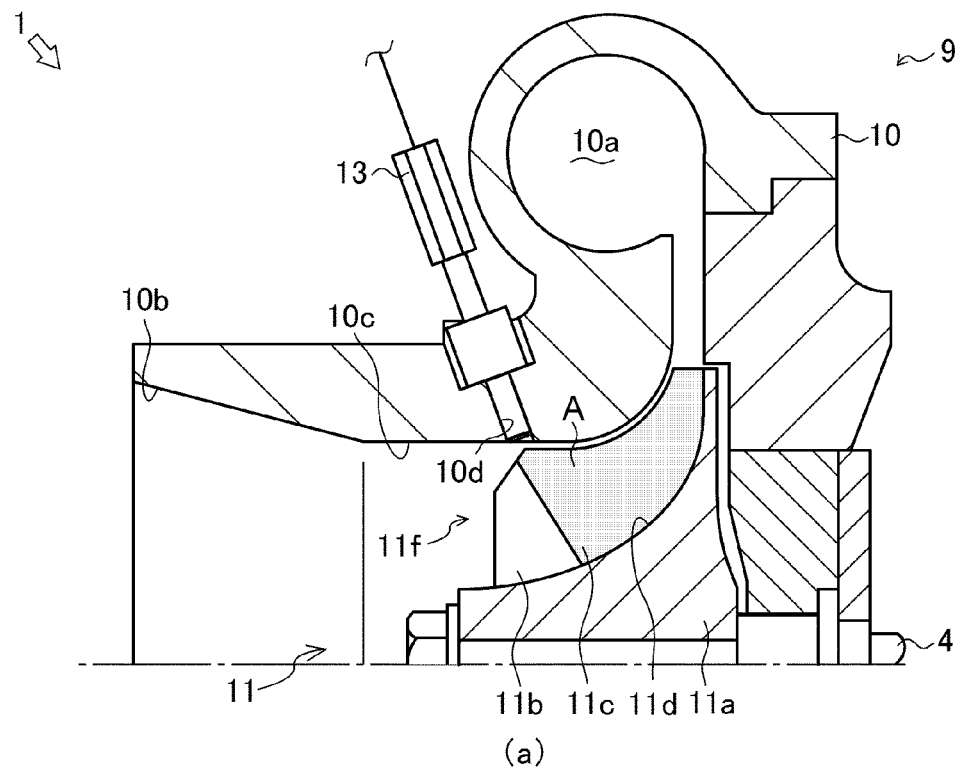
FIG. 2(a) is a partially cross-sectional view showing a relation between a detection unit of the rotation speed detection device and blades.
FIG. 2(b) is a partially cross-sectional view showing a relation between the detection unit of the rotation speed detection device and the pressure.
Figure 2:
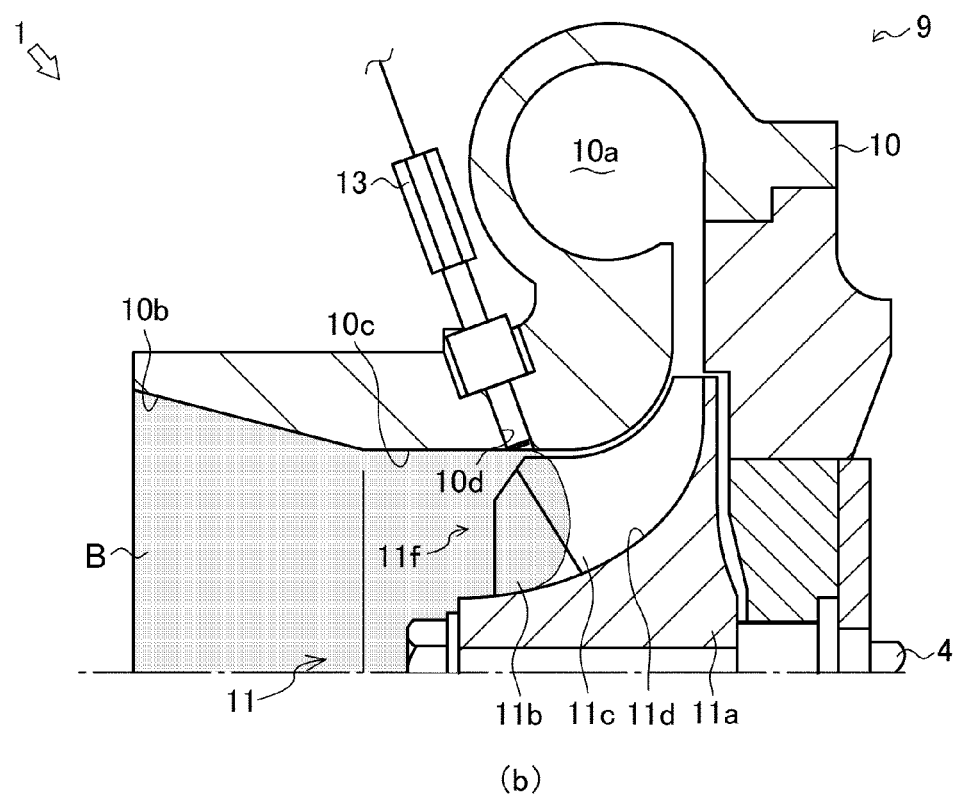

Next, an explanation will be given of the arranging place of the detection unit 13 of the rotation speed detection device 12 with reference to FIGS. 2 to 4.

In order to detect the full blades 11b and the splitter blades 11c which have different shapes, the detection unit 13 has to be disposed such that both of the full blades 11b and the splitter blades 11c pass through the magnetic field. Accordingly, as shown in FIG. 2(a), the detection unit 13 has to be disposed in a state in which a region A is included in a region of the magnetic field. The region A is the region where both of the full blades 11b and the splitter blades 11c approach the compressor casing 10.

Moreover, in order to improve detection accuracy, the detection unit 13 has to be disposed in a region where pressurized and compressed intake air pressure and compression heat does not influence. Accordingly, as shown in FIG. 2(b), the detection unit 13 has to be disposed in a region where intake air taken in the compressor casing 10 is not pressurized and compressed, that is, the detection unit 13 has to be included in a region B where the pressure inside the compressor casing 10 is in the range of a gauge pressure of one atmosphere or less.

Figure 3:
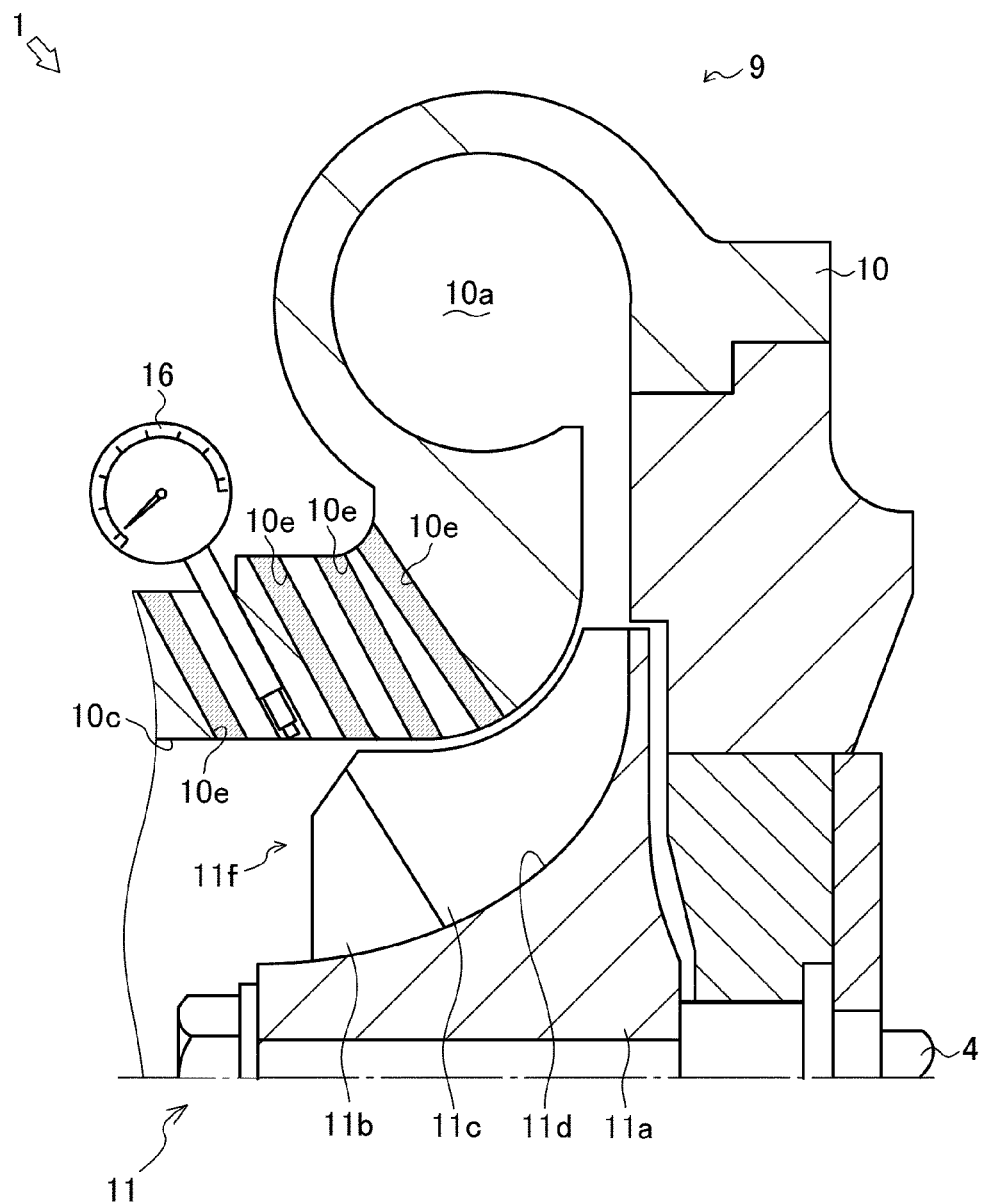
FIG. 3 is a partially cross-sectional view showing a pressure measuring state of the rotation speed detection device according to an embodiment of the present invention.
Figure 4:
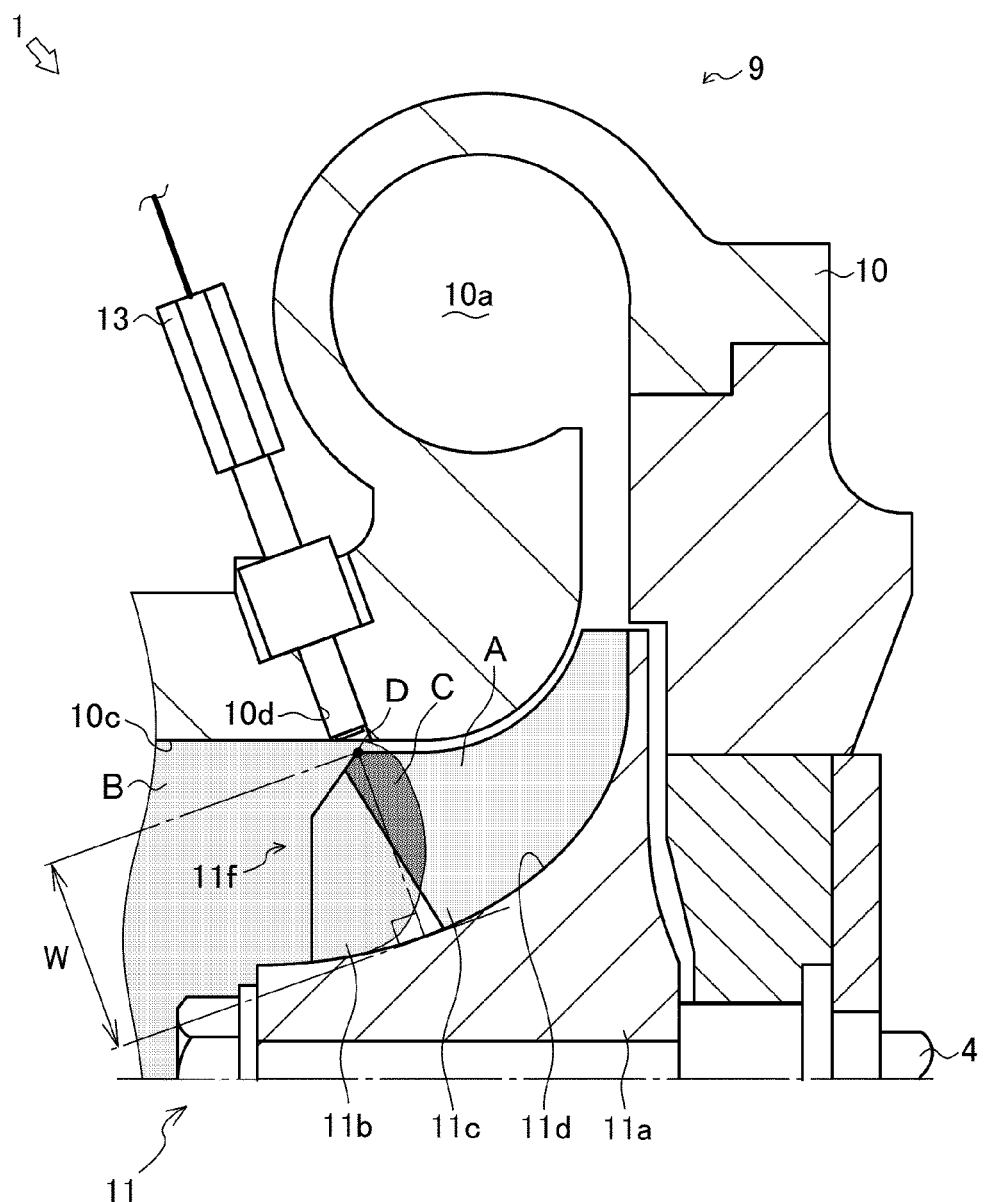
FIG. 4 is a partially cross-sectional view showing the relation between the detection unit of the rotation speed detection device, the blades, and the pressure.

As shown in FIG. 3, the range of the region B is determined by measuring the pressure inside the compressor casing 10. A plurality of measurement holes 10e are formed on the compressor casing 10 along the intake air compress passage 11f. The pressure inside the compressor casing 10 at each position, that is, the pressure at each measurement holes 10e, is measured. Thereby, the pressure inside the compressor casing 10 is determined. Specifically, a barometer 16 is inserted into each measurement hole 10e so as to measure the pressure in the vicinity of inside wall 10c of the compressor casing 10. As such, the pressure in the intake air compress passage 11f inside the compressor casing 10 can be measured without contacting with the full blades 11b and the splitter blades 11c during rotation. The region B is determined on the basis of the measured pressure of the intake air compress passage 11f. The barometer could be any type including mechanical type and bourdon tube type.

Figure 5:
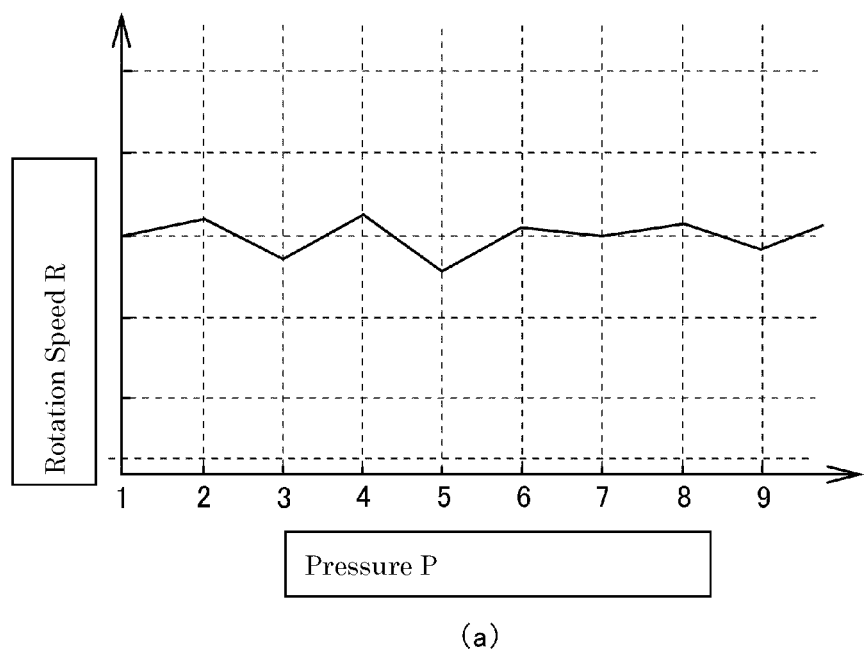
FIG. 5(a) illustrates a graph showing a detection result of the rotation speed detection device according to an embodiment of the present invention.
FIG. 5(b) illustrates a graph showing a detection result of the rotation speed detection device according to an embodiment of the conventional case.
Figure 5:
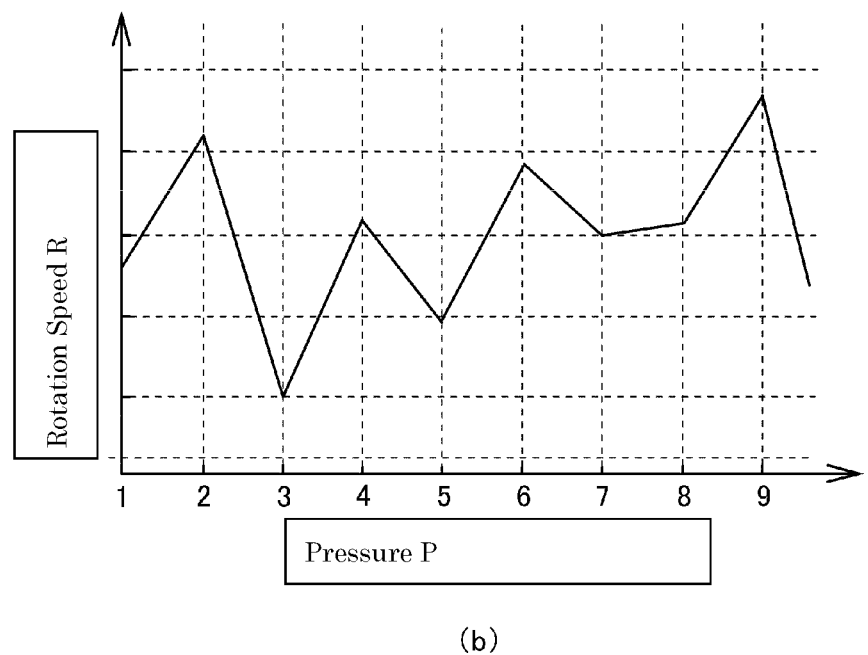

As described above, as shown in FIG. 4, the detection unit 13 has to be disposed such that an overlap region C is included in the region of the magnetic field. The overlap region C is a region where both of the full blades 11b and the splitter blades 11c can be detected, and where the pressure inside the compressor casing 10 is in the range of the gauge pressure of one atmosphere or less. By this arrangement, compared to the detection result of the conventional rotation speed detection device (see FIG. (b)), the detection result of the detection unit 13 is not affected by the pressure and compression heat (see FIG. 5(a)). That is to say, the full blades 11b and the splitter blades 11c can be detected regardless of the operating state of the compressor.

Furthermore, the detection unit 13 defines, in the overlap region C, end portion D of the full blade 11b or the splitter blade 11c in which a length W (hereinafter, referred to as "blade width") from the outer periphery surface 11d of the compressor hub 11a to the outer edge portion of the full blade 11b or the splitter blade 11c in its perpendicular direction becomes maximum as detection points. Since the position in which the blade width W becomes max in the overlap region C is included in the region of the magnetic field, the full blades 11b and the splitter blades 11c can be detected by the detection unit 13 accurately without the influence of the pressure and compression heat.

As described above, the rotation speed detection device 12 of the compressor 9 is provided. With respect to the rotation speed detection device 12, the detection unit 13 for detecting the full blades 11b and the splitter blades 11c that are all blades approaching the compressor casing 10 in response to the change in the inductance of the magnetic field is provided. The detection unit 13 is provided in the overlap region C in which the full blades 11b and the splitter blades 11c that are all blades can be detected and the exposure pressure is in the range of the gauge pressure of one atmosphere or less. Because of this configuration, when detecting the full blades 11b and the splitter blades 11c, the pressure and the compression heat of the pressurized and compressed intake air does not influence the detection result. As such, it is possible to achieve improved detection accuracy regardless of the compressor 9 and the operating state of the compressor 9. And it enables the prevention of the breakage of the detection unit 13.

Moreover, the detection unit 13 is provided in the overlap region C in which the full blades 11b and the splitter blades 11c that are all blades can be detected and the exposure pressure is in the range of the gauge pressure of one atmosphere or less. The detection unit 13 is provided such that end portions of the full blades 11b and the splitter blades 11c at which the blade width W of the outer periphery 11d of the compressor hub 11a that supports the full blades 11b and the splitter blades 11c in the perpendicular direction is maximized are detected.

Because of this configuration, when detecting the full blades 11b and the splitter blades 11c, the pressure and the compression heat of the pressurized and compressed intake air does not influence the detection result. And the arrangement of the detection unit 13 can easily be determined regardless of the shapes of the full blades 11b and the splitter blades 11c. As such, it is possible to achieve improved detection accuracy regardless of the compressor 9 and the operating state of the compressor 9. And it enables the prevention of the breakage of the detection unit 13.

The rotation speed detection device 12 of the present invention can be applied to an engine with turbocharger (a gasoline engine, or particularly a diesel engine). The present invention can be configured by attaching the detection unit 13 (turbo sensor) to the compressor 9 of the turbocharger 1. As such, this configuration can be used for the technique of installation structure of the detection unit 13 (turbo sensor), whereby the detection unit 13 is included in the rotation speed detection device 12 of the turbocharger 1 of the engine. With regard to the rotation speed detection device 12, the rotation speed of the turbocharger 1 of the engine is detected by the detection unit 13. As such, it is possible to execute various controls of the engine, and it is possible to improve performance and quality of the engine.

INDUSTRIAL APPLICABILITY

The present invention is applicable to a rotation speed detection device of a compressor.

NUMERICAL REFERENCE 1 turbocharger
9 compressor
11b full blade
11c splitter blade
12 rotation speed detection device
13 detection unit
C overlap region

What is claimed is:
1. A compressor, comprising:
a casing including a supply port and an exhaust passage;
a wheel including a hub having an outer periphery surface that serves as a base for the wheel;
at least one full blade and at least one splitter blade which are arranged on the outer periphery surface of the hub alternatively at regular intervals in a circumferential direction of the outer periphery surface of the hub, the at least one full blade and the at least one splitter blade each having different shapes, and end portions;
a rotation speed detection device including a detection unit for detecting passing of the at least one full blade and the at least one splitter blade which approach an inner wall of the casing in response to a change in inductance of a magnetic field, wherein:
the casing defines an insertion hole, the insertion hole configured to enable insertion of the detection unit;
detecting points are positions where a length in a perpendicular direction from the outer periphery surface of the hub to the end portions of the at least one full blade and the at least one splitter blade becomes maximum;
the detection unit is positioned in an overlap region where pressure inside the casing is in a range of a gauge pressure of one atmosphere or less during operation of the compressor;
the overlap region further corresponding to a region where the detecting points associated with the at least one full blade and the at least one splitter blade can both be detected by the detection unit; and
the overlap region is upstream of the at least one full blade and the at least one splitter blade with respect to airflow for the compressor.

2. The compressor of claim 1, wherein the insertion hole is arranged on an intake air supply port side of the casing.

3. The compressor of claim 1, wherein the detecting unit is obliquely inserted into the insertion hole of the casing and is inserted in the direction perpendicular to the outer periphery surface of the hub.

4. The compressor of claim 1, wherein the detecting unit is positioned obliquely relative to the casing and oriented along the perpendicular direction of the outer periphery surface of the hub.

5. The compressor of claim 1, wherein in the overlap region corresponds to a region where intake air in the casing is not compressed by the at least one full blade and the at least one splitter blade.

6. The compressor of claim 1, wherein the detection unit is flush with or recessed within the casing.

7. The compressor of claim 1, wherein the detection unit comprises a cylindrical shaped housing and a coil within the cylindrical shaped housing.

8. The compressor of claim 1, wherein the casing defines a plurality of measurement holes.

9. The compressor of claim 8, wherein the plurality of measurement holes are arranged along an intake air passage of the casing.

10. The compressor of claim 8, wherein each measurement hole is of the plurality of measurement holes is configured to receive a barometer, and wherein the barometers are configured to measure pressure to determine the overlap region.

* * * * *